INVENTORS
KAMEO UCHIYAMADA
MASAHIKO INOUE
KATSUO SAKURAI

Dec. 1, 1970   KAMEO UCHIYAMADA ET AL   3,544,162
ADJUSTABLE HEADREST FOR VEHICLE SEAT
Filed July 29, 1968   4 Sheets-Sheet 2

INVENTORS
KAMEO UCHIYAMADA
MASAHIKO INOUE
KATSUO SAKURAI
BY

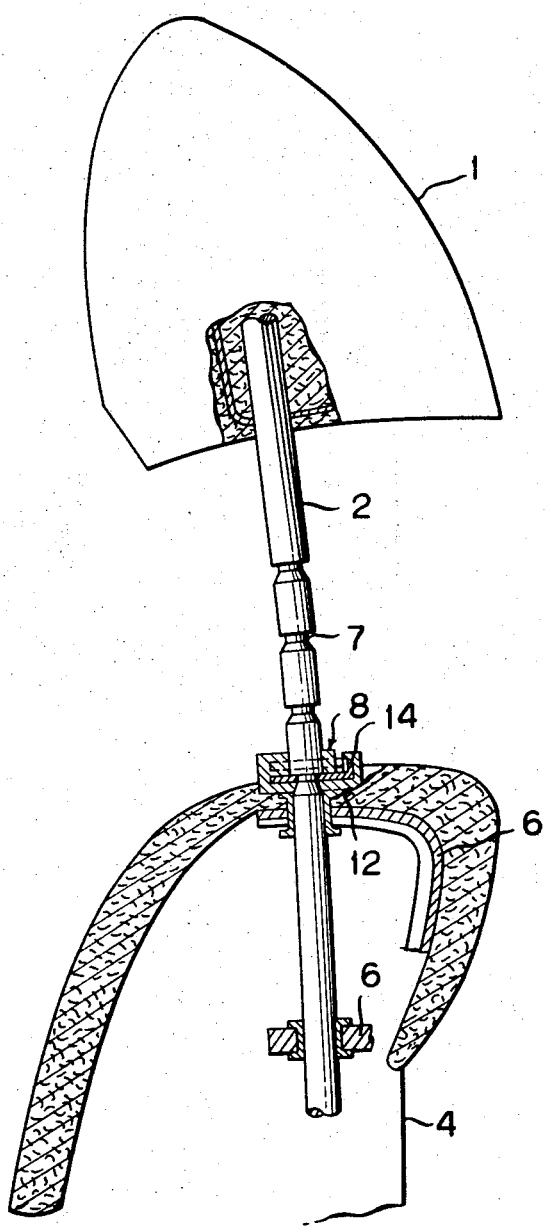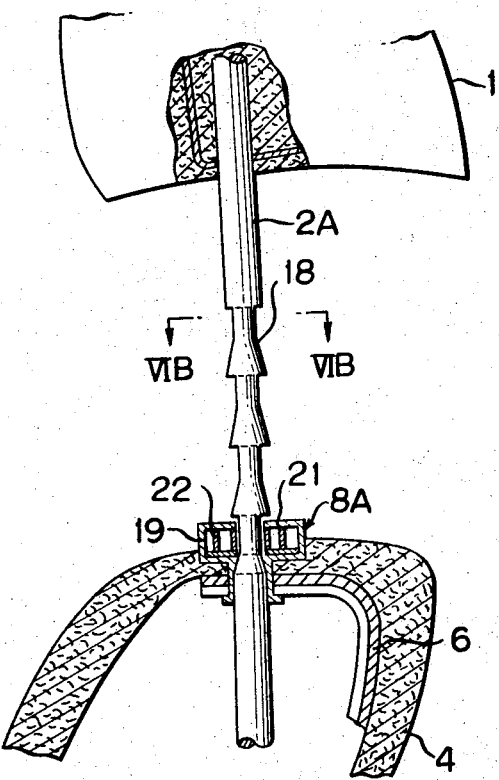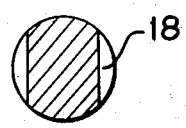

United States Patent Office 3,544,162
Patented Dec. 1, 1970

---

3,544,162
ADJUSTABLE HEADREST FOR VEHICLE SEAT
Kameo Uchiyamada, Okazaki-shi, and Masahiko Inoue and Katsuo Sakurai, Toyota-shi, Japan, assignors to Toyota Jidosha Kogyo Kabushiki Kaisha, Toyota-shi, Aichi-ken, Japan
Filed July 29, 1968, Ser. No. 748,329
Claims priority, application Japan, Aug. 7, 1967, 42/50,328
Int. Cl. A47c 7/36
U.S. Cl. 297—410                                7 Claims

ABSTRACT OF THE DISCLOSURE

An adjustable headrest for a vehicle seat is formed by a support rod fitted at its upper end into a headrest member and at its lower end into the frame of the vehicle seat. Means are adjustably positionable on the support rod for varying the height of the headrest above the seat. For such adjustable positioning transversely arranged grooves or recesses can be formed in the support rod arranged to receive spring loaded locking members supported on the vehicle seat. Alternatively, a threaded engagement or spacer tubes can be used for maintaining the desired distance between the seat and the headrest.

SUMMARY OF THE INVENTION

The invention is directed to a headrest assembly for a vehicle seat and, more particularly, it is concerned with means for adjustably positioning the headrest relative to the vehicle seat.

Recently headrests have been used on the seats in motor vehicles to limit the severity of head and neck injuries caused by rear end collisions. The great number and seriousness of neck injuries, often referred to as whiplash injuries, caused by rear end collisions has pointed up the need to afford protection for the driver and passengers from such injuries. However, while headrests limit the extent to which a person's head is thrown rearwardly as the result of a rear end collision, it must also be kept in mind that the rearward field of vision of the driver must not be seriously reduced, or else in correcting one hazard another hazard will be created.

In maintaining the size of the headrest within limits which will not encroach, to any great extent, on the field of vision of the driver it is also important to provide a headrest which is adjustably positionable to the height of the person using the seat. Moreover, since the adjustment of the headrest is normally a hand operation, the adjustment means must be easy to use while affording a positive engagement for the headrest in the desired position.

When a collision takes place and a person's head is thrown rearwardly, it generally strikes the headrest in a downwardly inclined direction whereby the force of the impact has a vertical and a horizontal component. Various experiments have shown that the vertical component of impact often exceeds 60 kg. As a result, it is necessary to provide locking means or other support means for holding the headrest in place against such a downward component of force. Therefore, it would not be adequate to provide a frictional engagement between the support rod for the headrest and the seat frame sufficient to counteract the vertical component of impact since such an arrangement would make adjustment extremely difficult. For ease in adjustment the means for positioning the headrest must be simple to operate, yet adequate to withstand the force generated by the impact of a person's head against the headrest.

Accordingly, it is the primary object of the present invention to provide a headrest assembly whose height above the seat is adjustable, yet is sufficient to support the headrest against the impact when a person's head is thrown rearwardly against it.

Another object of the invention is to employ hand operated means for adjusting the headrest which are easily manipulatable, yet sufficiently support the headrest against impact.

Yet, another object of the invention is to afford spring loaded means which grip grooves or recesses on the support rod for the head rest to afford positive engagement between the support rod and the member supporting it on the seat frame.

Therefore, the present invention is directed to an adjustable headrest for a vehicle seat in which headrest member is mounted on the upper end of a support rod while the lower end of the support rod is fitted within the frame of the vehicle seat. Means are provided for engaging the support rod and supporting it from the vehicle seat whereby the height of the headrest member is adjustable relative to the vehicle seat.

In one embodiment circumferentially extending grooves are provided in the support rod extending transversely of the longitudinal axis of the rod. A spring loaded disc or plate is provided within a casing supported on the seat for selectively engaging one of the grooves in the support rod for determining the height of the headrest member above the seat.

In another embodiment of the invention, segmental recesses are formed on opposite sides of the support rod and a spring clip is provided within a casing for selectively engaging the segmental recesses for establishing the desired height of the head rest above the seat. The support rod can be slidably positioned through the casing by turning the rod approximately 90° so that the spring clip is disengaged from the segmental recesses in the rod.

As an alternative to the spring loaded means for locking the support rod in place, the rod may be threaded and a similarly threaded support nut or plate mounted on the seat for adjusting the position of the headrest above the seat. In a further embodiment spacer tubes can be fitted onto the support rod extending between the seat and the headrest for establishing the desired spacing. Individual ones of the spacer tubes can be removed when it is necessary to change the height of the headrest above the seat.

It will be appreciated that in these various arrangements, simple hand operated means are provided for adjustably positioning the headrest relative to the seat and, at the same time, the means employed do not cause any kind of a safety hazard with respect either to blocking the view of the driver or incorporating structure which might cause injury to the person's riding in the vehicle.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 5 is a side view, partly in section, of the headrest assembly disclosed in FIG. 3;

FIG. 6(a) is a partial side view, partly in section, of another embodiment of the present invention;

FIG. 6(b) is a sectional view taken along line VIB—VIB of FIG. 6(a);

DETAILED DESCRIPTION OF THE PREFERRED EMBODIMENTS

Figure 1:
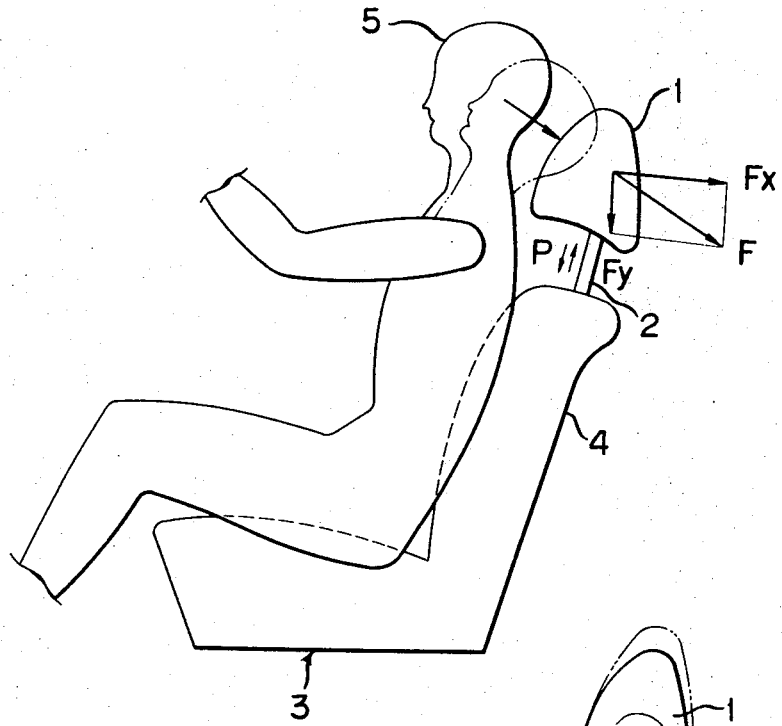
FIG. 1 is a schematic side view of a vehicle seat and a headrest and illustrating the components of force acting on the headrest due to a rearwardly directed impact.
Figure 2:
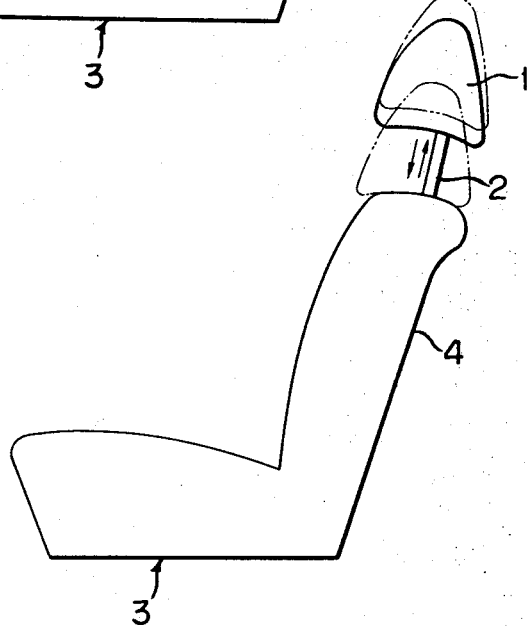
FIG. 2 is a schematic side view, similar to FIG. 1, illustrating the direction of adjustability of the headrest relative to the seat.

In FIGS. 1 and 2 a headrest assembly formed of a headrest member 1 and a support rod 2 are mounted on the top of a vehicle seat 3. In FIG. 1 the normal position of the head 5 of a person seated in a vehicle is shown in full lines. If the vehicle is involved in a rear end collision, there is a tendency for the person's head 5 to snap rearwardly, as shown in dot-dash lines in FIG. 1, and to strike the headrest member 1 in the direction indicated by the arrow. Due to the direction of impact against the headrest member 1, the impact force F has a horizontal component of force Fx and a vertical component of force Fy. The vertical component of force Fy tends to force the headrest downwardly into the back 4 of the seat 3. In FIGS. 3 to 9 a number of embodiments are shown for adjustably positioning the headrest member in the direction indicated by the arrows in FIG. 2. Since there can be considerable variation in the height of a person's head above the back 4 of the seat it is important to provide a wide range of adjustability for the headrest member and, at the same time to employ means which are easily manipulatable for properly adjusting the height of the headrest member 1.

Figure 3:
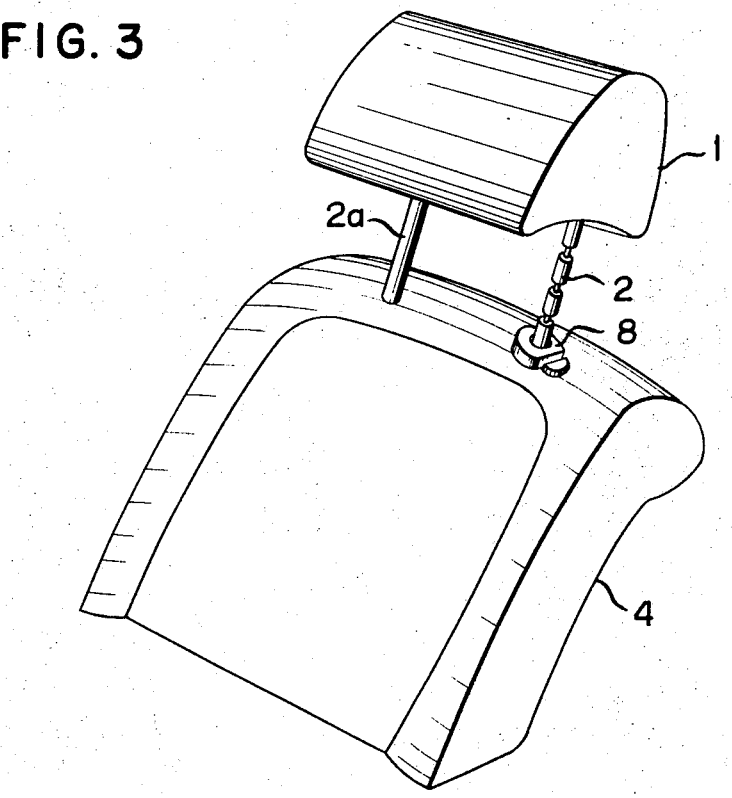
FIG. 3 is a perspective view of a vehicle seat and a headrest illustrating one embodiment of the present invention for adjustably positioning the headrest.
Figure 4A:
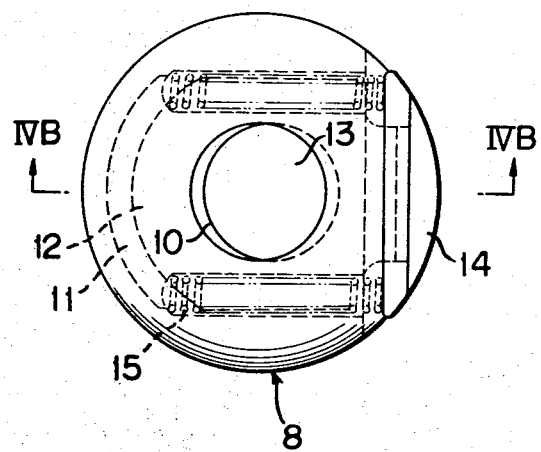
FIG. 4(a) is a plan view of a retaining member, shown in FIG. 3, for adjustably positioning the height of the headrest above the seat.
Figure 4B:
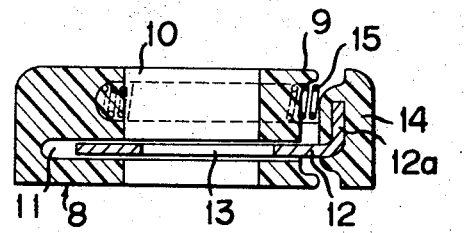
FIG. 4(b) is a sectional view taken along line IVB—IVB of FIG. 4(a)

In FIG. 3 the headrest member 1 is shown supported on the back 4 of the seat by a means of two rods 2, 2a. The rod 2a is a smooth member which extends downwardly into the frame of the seat while the support rod 2 is provided with a plurality of longitudinally spaced circumferentially extending grooves 7. As indicated in FIG. 5, the rod 2 extends downwardly through the top of the back 4 of the seat and is positioned in sliding engagement with the frame 6 of the seat. Mounted on the frame 6 and located on the top of the back 4 is a retaining member 8. The retaining member 8 is selectively engageable within the grooves 7 of the rod 2 for adjustably positioning the height of the headrest member 1 above the back 4 of the seat.

The retaining member 8 is formed of a casing 9 made of a synthetic resin or of a material having similar qualities, and is provided with an opening 10 slightly larger in diameter than the diameter of the rod so that the casing and the rod are movable relative to each other. Intermediate its upper and lower surfaces a transversely extending slot 11 is formed within the casing and extends across its opening 10. As is displayed in FIGS. 4(a) and 4(b) the slot 11 has a transverse area considerably greater than the opening 10 through the casing 9. A disc or plate member 12 is positioned within the slot 11 and has an opening 13 of approximately the same diametrical size as the opening 10. The opening is arranged to be aligned with the opening 10 for moving the rod 2 through the retaining member 8. The plate member 12 extends outwardly from the casing and its outer edge 12a is bent upwardly and is secured to a push member or operating bar 14. Above the location of the slot 11 a pair of bores extend through the casing perpendicularly to the longitudinal axis of the support rod 2. The bores are located on opposite sides of the opening 10 and a helical spring member 15 is positioned within each of them and extends outwardly into engagement with the surface of the operating bar 14. Due to the arrangement of the springs, normally the operating bar 14 is displaced outwardly from the casing and, in turn, the plate 12 is also displaced in such a manner that a part of the opening 13 in the plate is displaced laterally from alignment with the opening 10 in the casing 9. As a result, that portion of the plate member 12 forming the periphery of the opening 13 is urged into engagement within the groove 7 in the support rod 2 for locking the support rod in position on the frame of the seat.

When it is necessary to adjust the height of the headrest member 1 above the back 4 of the seat the operating bar 14 is displaced inwardly against the action of the springs 15 until the opening 13 in the plate 12 is aligned with the opening 10 in the casing 9. In this position the plate is released from the groove 7 in the support rod 2 and the headrest member 1 can be adjusted vertically. Once the desired height of the headrest is established the push member 14 is released and the springs 15 again force it outwardly and the plate member 12 about its opening 13 engages the selected groove in the rod for lockingly engaging the support rod 2 and holding it in place on the frame of the seat.

With the headrest locked in place as indicated in FIG. 5, if an impact, as shown in FIG. 1, is imparted to the headrest, the retaining member 8 will prevent it from being depressed downwardly into the back of the seat, and the backward movement of the person's head will be arrested thereby preventing any serious injury to the neck. In the arrangement shown in FIGS. 3 to 5, the retaining member 8 rests on the frame 6 of the seat but is not secured to it, however, if the retaining member is fixed to the frame 6, any unexpected upward displacement of the supporting rod 2 can be prevented.

Figure 7A:
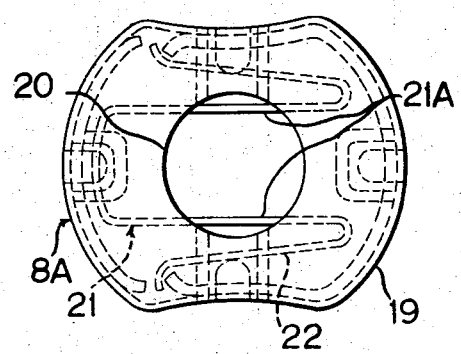
FIG. 7(a) is a plan view of a retaining member illustrated in FIG. 6(a)
Figure 7B:
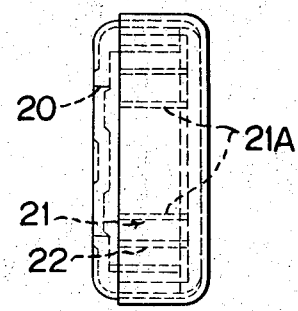
FIG. 7(b) is a side view of the retaining member shown in FIG. 7(a)

In FIGS. 6 and 7 another embodiment of a support rod 2A is shown having a plurality of longitudinally spaced pairs of segmental cutouts or recesses 18 formed in its periphery. In FIG. 5 the grooves 7 are shown extending completely around the circumference of the rod 2, however, in FIG. 6(a) and FIG 6(b) the segmental recesses are disposed on opposite sides of and do not extend completely about the circumference of the rod 2A. Mounted on the frame 6 of the seat is a retaining member 8A having a box-like casing 19 containing a hole 20 of a diameter slightly larger than the diameter of the rod 2A and adapted to permit the rod 2A to be slidably positioned through the retaining member 8A. Within the interior of the casing 19 is a spring retainer 21 which extends transversely of the longitudinal axis of the support rod 2A. As best illustrated in FIG. 7(a) the retainer spring 21 is formed of a U-shaped section 21A the opposite legs of which extend chordally across the opening 20 in the casing and are arranged to engage the segmental recesses 18 in the support rod 2A. The ends of the legs of the U-shaped section 21A remote from the bight portion have a reverse bend and continue as legs, 22, which form a V-shaped configuration with the legs of the U-shaped section, and terminate against the side walls of the casing 19. Due to the manner in which the retainer spring 21 is supported within the casing 19 its U-shaped section 21A is normally urged inwardly in alignment with the opening 20 through the casing 19 for gripping the cutouts or recesses 18 in the support rod 2A.

When it is desired to adjust the height of the headrest the retaining member 8A is rotated about the rod approximately 90° whereby the retainer spring is disengaged from the cutouts 18 and contacts the smooth outside diameter surface of the support rod 2A. In this position the support rod can be moved through the opening 20 in the casing 19 until the desired position of the headrest member 1 is established and then by rotating the retaining member 8A 90° the U-shaped section 21A of the retainer spring 21 will again seat within the segmental cutouts 18 in the rod and hold the headrest in the desired vertical position above the seat.

Figure 8:
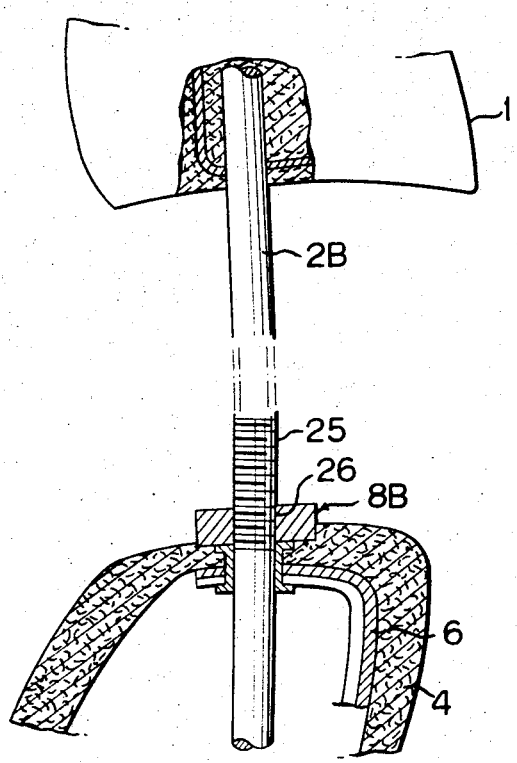
FIG. 8 is a side view, partly in section, illustrating still another embodiment of the present invention.

In FIG. 8 instead of the spring loaded retaining members 8 and 8A previously discussed, a threaded retaining member 8B, such as a nut, is fitted on a threaded portion 25 of a support rod 2B. In this ararngement when adjustment of the headrest is desired the threaded portion 26 of the retaining member 8B is screwed about the threaded portion 25 of the support rod 2B and the headrest is moved upwardly or downwardly accordingly. As compared to the grooves employed for positioning the support rod in the previous embodiments the use of the threaded retaining member 8B permits a continuous fine adjustment of the headrest member 1 relative to the back of the seat.

Figure 9A:
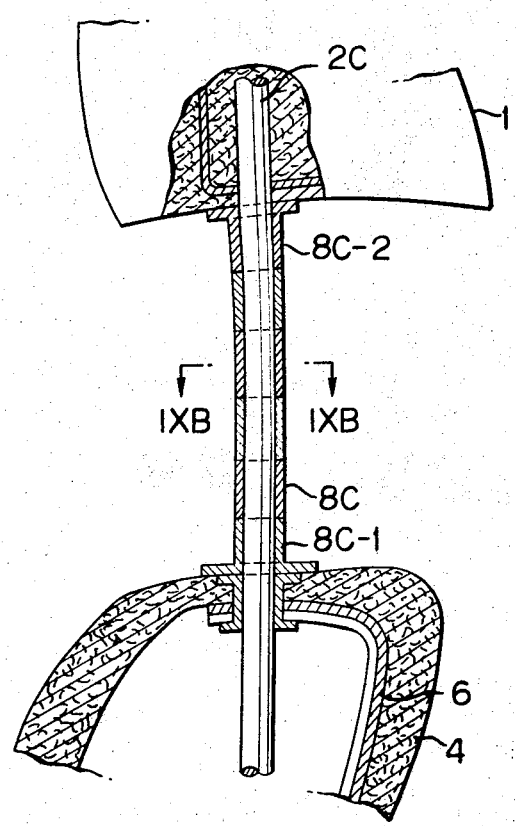
FIG. 9(a) is a side view, partly in section, disclosing a further embodiment of the present invention.
Figure 9B:
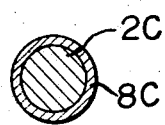
FIG. 9(b) is a sectional view taken along line IXB—IXB of FIG. 9(a).

In still another embodiment, as shown in FIG. 9(a) and FIG. 9(b), a support rod 2C is provided with a number of spacer tubes 8C which afford the desired adjustment in height of the headrest member 1 relative to the seat. In FIG. 9(b) the retaining member spacer tubes 8C are shown completely encircling the support rod 2C, however, it will be appreciated that the spacer tubes 8C can be given a U-shaped configuration for sliding transversely onto the support rod 2C without requiring any additional manipulation in locating or removing the spacer tubes 8C from the support rod. Further, as shown in FIG. 9(a), a flange member 8C–1 is mounted on the top of the back of the seat and a similar flange 8C–2 is mounted on the supporting rod above the back of the seat for holding the headrest member 1 in position. When it is necessary to adjust the position of the headrest member shown in FIG. 9(a) if the U-shaped spacer tubes 8C are employed an individual tube spacer section may be removed or replaced on the support rod 2C for obtaining the desired spacing, or if regular tubular sections are employed, then it is necessary to remove the headrest from the support rod 2C and then to remove or replace the spacer tubes 8C to achieve the desired spacing.

As mentioned previously, the present invention affords the regulation of the height of the headrest member above the back of the seat and at the same time locks the headrest member in position so that it is not displaced downwardly due to an impact against the headrest.

What is claimed is:

1. A headrest assembly for a vehicle seat comprises a headrest member, at least one longitudinally extending support rod secured at its upper end to said headrest member and arranged to extend downwardly with its lower end disposed within the frame of the vehicle seat, means adjustably positionable on said rod and arranged to be removably supported on the top of the vehicle seat for varying the height of said headrest member above the vehicle seat, said support rod having a plurality of longitudinally spaced recesses formed therein extending transversely of the longitudinal axis of said support rod, said means arranged to engage said recesses for adjustably positioning said headrest member above the vehicle seat, said means comprising a casing arranged to be removably supported on the top of the vehicle seat, said casing extending transversely of the longitudinal axis of said support rod and having an opening therethrough arranged about said support rod, said opening having a diameter slightly greater in size than said support rod for permitting said rod to be moved through said casing, and spring loaded means positioned within said casing for selective engagement within one of said recesses in said support rod for securing said support rod against movement relative to said casing for supporting and spacing said headrest member from the vehicle seat.

2. A headrest assembly, as set forth in claim 1, wherein said recesses extend circumferentially about said support rod, said casing having a slot formed therein extending transversely of the longitudinal axis of said support rod and having a greater transverse area than that of the opening through said casing, said slot being coextensive in the transverse direction with the opening in said casing, and said spring loaded means comprising a transversely extending plate member positioned within said slot and having an opening therethrough arranged to fit about said support rod and having a diameter slightly greater than the diameter of said rod for permitting said support rod to be moved through the opening in said plate member, and spring means disposed within said casing and in operative engagement with said plate member for biasing said plate member within said slot in said casing so that the opening in said plate member is moved out of alignment with the opening in said casing whereby the portion of said plate member forming the periphery of the opening therethrough is seated within one of said recesses in said support rod for supporting said headrest member relative to the vehicle seat.

3. A headrest assembly, as set forth in claim 2, wherein said spring means comprises a pair of transversely spaced elongated helical springs mounted in said casing on diametrically opposed sides of the opening therethrough, one end of each of said springs acting against said casing and the other end of each of said springs acting against said plate member for biasing said plate member in a position so that the opening therethrough is out of alignment with the opening through said casing.

4. A headrest assembly, as set forth in claim 3, wherein a portion of said plate member of said plate located within said slot in said casing extends outwardly from said casing, and an operating bar secured to said plate member exteriorily of said casing and arranged to depress said plate member against said helical springs for aligning the opening in said plate member with the opening in said casing for moving said support rod through the openings in said casing and plate member for adjustably positioning said headrest member.

5. A headrest assembly, as set forth in claim 1, wherein each of said recesses in said support rod comprises a pair of segmental cutouts formed on opposite sides of said support rod, said casing having a slot formed therein extending transversely of the longitudinal axis of said support rod and having a greater transverse area than that of the opening through said casing, said slot being co-extensive in a transverse direction with the opening in said casing, and said spring loaded means comprising a spring clip member disposed within the slot in said casing, said spring clip member comprises a U-shaped section and a leg extending from each of the free ends of said U-shaped section outwardly from said U-shaped section in a reverse direction to that of the limbs of said U-shaped section from the bight ends to the free ends thereof, the ends of said legs remote from said U-shaped section being in contact with the interior surface of said casing within said slot for urging said U-shaped section inwardly into alignment with the opening through said casing, the limbs of said U-shaped section being arranged to engage within one pair of said segmental cutouts in the opposite sides of said support rod for adjustably positioning said headrest member relative to the vehicle seat.

6. A headrest assembly for a vehicle seat comprises a headrest member, at least one support rod secured at its upper end to said headrest member and arranged to extend downwardly with its lower end disposed within the frame of the vehicle seat, and means adjustably positionable on said rod and arranged to be supported on the top of the vehicle seat for varying the height of said headrest member above the vehicle seat, and said means adjustably positionable on said rod comprising a plurality of spacer tubes having a diametrical size sufficient to fit closely about said rod in end to end engagement, and said spacer tubes being arranged to extend between said headrest member and the vehicle seat for adjustably positioning the height of said headrest member relative to the vehicle seat.

7. A headrest assembly for a vehicle seat comprises a headrest member, at least one support rod secured at its upper end to said headrest member and arranged to extend downwardly with its lower end disposed within the frame of the vehicle seat, and means adjustably positionable on said rod and arranged to be supported on the top of the vehicle seat for varying the height of said headrest member above the vehicle seat, and said means adjustably positionable on said rod comprising a plurality of spacer members having a size sufficient to fit closely about at least a portion of said rod in end to end engagement, and said spacer members being arranged to extend between said headrest member and the vehicle seat for adjustable positioning the height of said headrest member relative to the vehicle seat.

References Cited

UNITED STATES PATENTS

| 1,357,825 | 11/1920 | Shaw | 248—408 |
| 1,867,600 | 7/1932 | Schwarzkopf | 297—410 |
| 2,613,731 | 10/1952 | Roginski | 297—410 X |
| 2,939,514 | 5/1960 | Buettner | 248—408 |
| 3,027,194 | 3/1962 | Rumptz | 297—410 |
| 3,169,744 | 2/1965 | Nocek | 248—405 |

FOREIGN PATENTS

| 19,177 | 8/1914 | Great Britain. |

NILE C. BYERS, Jr, Primary Examiner